US012663963B2

(12) United States Patent
Lee et al.

(10) Patent No.: US 12,663,963 B2
(45) Date of Patent: Jun. 23, 2026

(54) APPARATUS AND METHOD WITH IN-MEMORY COMPUTING

(71) Applicants: Samsung Electronics Co., Ltd., Suwon-si (KR); Research & Business Foundation SUNGKYUNKWAN UNIVERSITY, Suwon-si (KR)

(72) Inventors: Yoonmyung Lee, Seongnam-si (KR); Soyoun Jeong, Suwon-si (KR); Jaerok Kim, Suwon-si (KR)

(73) Assignees: Samsung Electronics Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 1164 days.

(21) Appl. No.: 17/674,134

(22) Filed: Feb. 17, 2022

(65) Prior Publication Data

US 2023/0053948 A1 Feb. 23, 2023

(30) Foreign Application Priority Data

Aug. 19, 2021 (KR) ......................... 10-2021-0109250

(51) Int. Cl.
*G06F 7/544* (2006.01)
*G06G 7/16* (2006.01)

(52) U.S. Cl.
CPC ............. *G06F 7/5443* (2013.01); *G06G 7/16* (2013.01)

(58) Field of Classification Search
CPC .... G06F 15/7821; G06F 17/16; G06F 7/5443; G06G 7/16–161; G06N 3/063–065
See application file for complete search history.

(56) References Cited

U.S. PATENT DOCUMENTS 9,767,900 B2 * 9/2017 Miao ...................... H10B 63/30
11,232,824 B1 * 1/2022 Gong .................. G11C 11/2273
(Continued)

FOREIGN PATENT DOCUMENTS

CN 102811051 B 10/2014
CN 112583589 A 3/2021
(Continued)

OTHER PUBLICATIONS

Chiu, Pi-Feng, et al. "A binarized neural network accelerator with differential crosspoint memristor array for energy-efficient MAC operations." 2019 IEEE international symposium on circuits and systems (ISCAS). IEEE, 2019. (Year: 2019).*
(Continued)

*Primary Examiner* — Matthew D Sandifer
(74) *Attorney, Agent, or Firm* — NSIP Law

(57) ABSTRACT

A multiply-accumulator (MAC) circuit includes: a plurality of multipliers each comprising: a field-effect transistor configured to apply an intermediate voltage to a node; a pair of resistive devices having resistance values determined based on the intermediate voltage applied to one ends connected to the node and weight setting voltages applied to the other ends; and a capacitor configured to be charged and discharged with an electric charge by receiving a voltage generated in the node based on a combined resistance value of the pair of resistive devices and input voltages applied individually to the other ends of the pair of resistive devices in response to individual resistance values of the pair of resistive devices being determined; and an output line configured to output a voltage based on electric charges charged to and discharged from the plurality of multipliers.

25 Claims, 11 Drawing Sheets

(56) References Cited

U.S. PATENT DOCUMENTS

| | | | |
|---|---|---|---|
| 2018/0095748 A1 | 4/2018 | Buchanan et al. | |
| 2020/0034686 A1* | 1/2020 | Chiu | G11C 13/004 |
| 2020/0035305 A1* | 1/2020 | Choi | G11C 13/0028 |
| 2022/0261625 A1* | 8/2022 | Lee | G06N 3/065 |
| 2022/0365752 A1* | 11/2022 | Lee | G06F 7/5443 |
| 2024/0412783 A1* | 12/2024 | Hu | G11C 13/003 |

FOREIGN PATENT DOCUMENTS

| | | | | |
|---|---|---|---|---|
| EP | 3 136 398 A1 | | 3/2017 | |
| EP | 4174724 A1 | * | 5/2023 | G06N 7/01 |
| KR | 10-2016-0101901 A | | 8/2016 | |
| KR | 10-2017-0137761 A | | 12/2017 | |
| KR | 20230053976 A | * | 4/2023 | G06N 3/065 |
| WO | WO 2020/068307 A1 | | 4/2020 | |

OTHER PUBLICATIONS

Chiu, Pi-Feng, and Borivoje Nikolić. "A differential 2R crosspoint RRAM array with zero standby current." IEEE Transactions on Circuits and Systems II: Express Briefs 62.5 (2014): 461-465. (Year: 2014).*

Yue, Jinshan, et al. "AERIS: Area/Energy-efficient 1T2R ReRAM based processing-in-memory neural network system-on-a-chip." Proceedings of the 24th Asia and South Pacific design automation conference. 2019. (Year: 2019).*

Pal Chowdhury, Arjun, Pranav Kulkarni, and Mahdi Nazm Bojnordi. "MB-CNN: Memristive binary convolutional neural networks for embedded mobile devices." Journal of Low Power Electronics and Applications 8.4 (2018): 38. (Year: 2018).*

Chen, Wei-Hao, et al. "A 65nm 1Mb Nonvolatile Computing-in-Memory ReRAM Macro with Sub-16ns Multiply-and-Accumulate for Binary DNN AI Edge Processors." *International Solid-State Circuits Conference IEEE vol. 31 Issue 4*, Feb. 14, 2018 pp. 494-496.

Wei, Ligiong, et al. "13.3 A 7Mb STT-MRAM in 22FFL FinFET Technology with 4ns Read Sensing Time at 0.9 V Using Write-Verify-Write Scheme and Offset-Cancellation Sensing Technique." *IEEE International Solid-State Circuits Conference IEEE vol. 13 Issue 3*, Feb. 19, 2019 pp. 214-216.

Yin, Shihui, et al. "High-Throughput In-Memory Computing for Binary Deep Neural Networks with Monolithically Integrated RRAM and 90-nm CMOS." *IEEE Transactions on Electron Devices vol. 67 Issue 10*, 2020 pp. 4185-4192.

Extended European search report issued on Oct. 14, 2022, in counterpart European Patent Application No. 22169715.4 (10 pages in English).

* cited by examiner

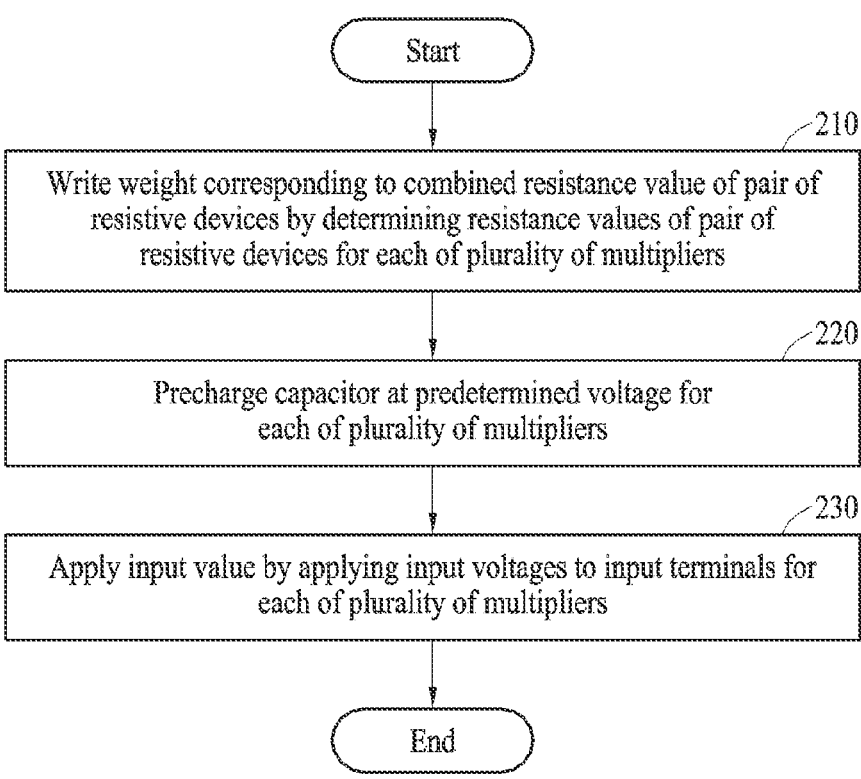

Start

210

Write weight corresponding to combined resistance value of pair of resistive devices by determining resistance values of pair of resistive devices for each of plurality of multipliers

220

Precharge capacitor at predetermined voltage for each of plurality of multipliers

230

Apply input value by applying input voltages to input terminals for each of plurality of multipliers End

$$y_i = f\left( \sum_{j=1}^{m} w_{j,i} \cdot x_j \right)$$

APPARATUS AND METHOD WITH IN-MEMORY COMPUTING

CROSS-REFERENCE TO RELATED APPLICATIONS

This application claims the benefit under 35 USC § 119 (a) of Korean Patent Application No. 10-2021-0109250, filed on Aug. 19, 2021 in the Korean Intellectual Property Office, the entire disclosure of which is incorporated herein by reference for all purposes.

BACKGROUND

1. Field

The following description relates to an apparatus and method with in-memory computing.

2. Description of Related Art

A vector matrix multiply operation, also known as a multiply and accumulate (MAC) operation, may determine the performance of applications in various fields. For example, in machine learning and authentication operations of a neural network including multiple layers, a MAC operation may be performed. An input signal may be considered to form an input vector, and may be data for an image, a stream of bytes, or other data sets. The input signal may be multiplied by a weight, an output vector is obtained from a cumulative MAC operation result, and the output vector may be provided as an input vector for a next layer. When the MAC operation is repeated for multiple layers, the neural network processing performance may be mainly determined by the performance of the MAC operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multiply-accumulator (MAC) circuit includes: a plurality of multipliers each comprising: a field-effect transistor configured to apply an intermediate voltage to a node; a pair of resistive devices having resistance values determined based on the intermediate voltage applied to one ends connected to the node and weight setting voltages applied to the other ends; and a capacitor configured to be charged and discharged with an electric charge by receiving a voltage generated in the node based on a combined resistance value of the pair of resistive devices and input voltages applied individually to the other ends of the pair of resistive devices in response to individual resistance values of the pair of resistive devices being determined; and an output line configured to output a voltage based on electric charges charged to and discharged from the plurality of multipliers.

Each of the pair of resistive devices may be either one of a resistive random access memory (RRAM) and a magnetic random access memory (MRAM).

Each of the pair of resistive devices may be a resistive device having a variable resistance value.

For each of the multipliers, the MAC circuit may be configured to: determine the resistance values of the pair of resistive devices by applying a voltage to both ends of each of the pair of resistive devices; and write a weight according to a combined resistance value of the pair of resistive devices on the multiplier.

The combined resistance value of the pair of resistive devices may correspond to one ternary value among ternary values representing weights of connection lines between layers included in a neural network.

The MAC circuit may be configured to: apply a preset voltage to input terminals connected to the other ends of the pair of the resistive devices before the input voltages are applied to the pair of resistive devices; and apply the preset voltage to the output line so as to precharge both ends of the capacitor at the preset voltage.

In response to the resistance values of the pair of resistive devices being determined, the MAC circuit may be configured to: individually apply the input voltages to input terminals connected to the other ends of the pair of resistive devices; and apply an input value according to combined input voltages to a multiplier.

The combined input voltages may correspond to one ternary value among ternary values representing output values of nodes included in layers of a neural network.

The MAC circuit may be configured to generate, in the node, a voltage corresponding to a value calculated by multiplying an input value corresponding to a combination of the input voltages individually applied to the pair of resistive devices, by a weight corresponding to a combination of the resistance values of the pair of resistive devices.

The output line may be connected to each of the capacitors included in each of the plurality of multipliers and may be configured to output a voltage based on an accumulation of electric charges charged to and discharged from each of the capacitors of the plurality of multipliers through capacitive coupling.

In another general aspect, a method performed by a multiply-accumulator (MAC) circuit includes: determining resistance values of a pair of resistive devices based on an intermediate voltage applied to one ends of the pair of resistive devices connected to a node and weight setting voltages applied to the other ends of the pair of resistive devices; charging and discharging an electric charge based on a voltage generated in the node based on a combined resistance value of the pair of resistive devices and input voltages individually applied to the other ends of the pair of resistive devices in response to individual resistance values of the pair of resistive devices being determined; and outputting a voltage based on the charged and discharged electric charge.

Each of the pair of resistive devices may be either one of a resistive random access memory (RRAM) and a magnetic random access memory (MRAM).

The determining of the resistance values of the pair of resistive devices may include: determining the resistance values of the pair of resistive devices by applying a voltage to both ends of each of the pair of resistive devices; and writing a weight according to a combined resistance value of the pair of resistive devices on a multiplier comprising the pair of resistive devices.

The combined resistance value of the pair of resistive devices may correspond to one ternary value among ternary values representing weights of connection lines between layers included in a neural network.

The charging and discharging of the electric charge may include precharging both ends of a capacitor at a preset voltage by applying, before the input voltages are applied to the pair of resistive devices, the preset voltage to input terminals connected to the other ends of the pair of the resistive devices and applying the preset voltage to an output line.

In response to the resistance values of the pair of resistive devices being determined, the charging and discharging of the electric charge may include: individually applying the input voltages to input terminals connected to the other ends of the pair of resistive devices; and applying an input value according to combined input voltages to a multiplier.

The combined input voltages may correspond to one ternary value among ternary values representing output values of nodes included in layers of a neural network.

The charging and discharging of the electric charge may include generating, in the node, a voltage corresponding to a value calculated by multiplying an input value corresponding to a combination of the input voltages individually applied to the pair of resistive devices, by a weight corresponding to a combination of the resistance values of the pair of resistive devices.

In another general aspect, one or more embodiments include a non-transitory computer-readable storage medium storing instructions that, when executed by one or more processors, configure the one or more processors to perform any one, any combination, or all operations and methods described herein.

In another general aspect, a multiplier included in a multiply-accumulator (MAC) circuit includes: a field-effect transistor configured to apply an intermediate voltage to a node; a pair of resistive devices having resistance values determined based on the intermediate voltage applied to one ends connected to the node and weight setting voltages applied to the other ends; and a capacitor configured to be charged and discharged with an electric charge by receiving a voltage generated in the node based on a combined resistance value of the pair of resistive devices and input voltages applied individually to the other ends of the pair of resistive devices in response to individual resistance values of the pair of resistive devices being determined.

The multiplier may be configured to generate, in the node, a voltage corresponding to a value calculated by multiplying an input value corresponding to a combination of the input voltages individually applied to the pair of resistive devices, by a weight corresponding to a combination of the resistance values of the pair of resistive devices.

In another general aspect, a method performed by a multiply-accumulator (MAC) circuit includes: writing a weight for a multiplier by applying an intermediate voltage to a node, the node corresponding to an end of each of a first resistive device and a second resistive device of the multiplier, and by applying a first weight setting voltage to another end of the first resistive device and a second weight setting voltage to another end of the second resistive device; applying an input value to the multiplier by applying a first input voltage to the other end of the first resistive device and a second input voltage to the other end of the second resistive device; and generating an output value of a neural network node by discharging a capacitor in response to the applying of the input value.

The writing of the weight may include: writing a first weight in response to the first weight setting voltage being greater than the second weight setting voltage; writing a second weight in response to the first weight setting voltage being a same value as the second weight setting voltage; and writing a third weight in response to the first weight setting voltage being less than the second weight setting voltage.

The applying of the input value may include: applying a first input value in response to the first input voltage being greater than the second input voltage; applying a second input value in response to the first input voltage being a same value as the second input voltage; and applying a third input value in response to the first input voltage being less than the second input voltage.

The method may include, in response to the writing of the weight, applying a predetermined voltage to the other end of the first resistive device, the other end of the second resistive device, and an output line connected to an end of the capacitor, wherein the applying of the input value may include applying the input value in response to the applying of the predetermined voltage.

Other features and aspects will be apparent from the following detailed description, the drawings, and the claims.

BRIEF DESCRIPTION OF THE DRAWINGS

FIG. 2 is a flowchart illustrating an example of a computing method using a MAC circuit.

Figure 1:
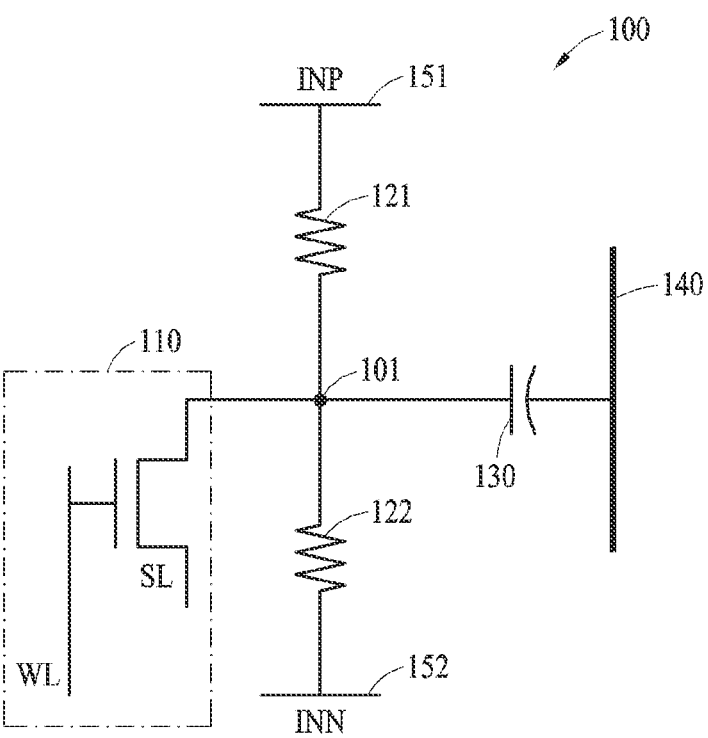
FIG. 1 illustrates an example of one multiplier included in a multiply-accumulator (MAC) circuit.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for the purpose of describing examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. It should be further understood that the terms "comprises" "comprising," "includes," and/or "including" when used in this specification, specify the presence of stated features, integers, steps, operations, elements, components, and/or a combination thereof, but do not preclude the presence or addition of one or more other features, integers, steps, operations, elements, components, and/or combinations thereof.

Unless otherwise defined, all terms including technical or scientific terms used herein have the same meaning as commonly understood by one of ordinary skill in the art to which examples belong and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 illustrates an example of one multiplier included in a multiply-accumulator (MAC) circuit.

To efficiently implement artificial intelligence, a neural network operation may be accelerated. A processing performance of a neural network may be generally determined based on a performance of a multiply and accumulate (MAC) operation. In this disclosure, a MAC may refer to either one or both of a "multiply-accumulator" and a "multiply and accumulate" operation. When the neural network operation is implemented in hardware having a von Neumann structure, a bottleneck may be caused by excessive generation of memory access traffic, inefficiency may be caused due to energy consumed for memory access, and it may be difficult to efficiently implement the MAC operation. To solve this, a type of in-memory computing such as a method of accelerating a neural network operation using a non-volatile memory device may be used. A typical method of performing an in-memory computing operation may include using a resistive device such as a resistive random access memory (RRAM) and a magnetic random access memory (MRAM). When various neural network operations are implemented in-memory using resistance changes of various non-volatile devices such as RRAM and MRAM, a neural network operation may be implemented with reduced memory access and greatly improved computational efficiency. For example, a typical MAC circuit that includes resistive devices such as RRAM and MRAM to perform a neural network operation may obtain a result of the MAC operation in a form of current and then output the result of operation through a current sense amplifier. However, in this current sensing method using the current sense amplifier, when a MAC value corresponding to the result of the MAC operation increases, sensing ranges may overlap. To solve this, a circuit may obtain a result of MAC operation in a form of voltage using a voltage sensing method. However, the MAC circuit that includes resistive devices such as RRAM and MRAM using the voltage sensing method may not guarantee linearity between a MAC operation result and an output of a MAC circuit depending on the number of resistive devices used. For example, a typical MAN circuit including a resistive device of RRAM may not guarantee the linearity between the MAC operation result and the output of the MAC circuit according to the number of resistive devices of the RRAM used in a turned-on state (e.g., a low resistance state (LRS)). The typical MAC circuit may use an additional circuit to correct the linearity between the MAC operation result and the output of the MAC circuit, but does not show perfect linearity.

In addition, the in-memory computing operation using the resistive device may be sensitive to variation in the resistance value of the resistive device. To avoid the variation in the resistance value of the resistive device, a Write-Verify method, which repeats writing and reading the resistance value of the resistive device over several cycles, may be used. The Write-Verify method may correct the variation in the resistance value of the resistive device and guarantee an on-off ratio of the resistive device. When the on-off ratio of the resistive device is not guaranteed, the in-memory computing operation may not be implemented using a typical resistive device. The on-off ratio of the resistive device may be a ratio of a resistance value obtained when the resistive device is in an on state to a resistance value obtained when the resistive device is in an off state.

As such, the typical MAC circuit capable of performing the in-memory computing operation may have issues related to the linearity between the MAC operation result and the output of the MAC circuit, the variation of the resistive device, and additional time and space loss for correcting the on-off ratio of the resistive devices. As will be described later, in contrast to the typical MAC circuit, a MAC circuit of one or more embodiments of the present disclosure may ensure the linearity between the MAC operation result and the output of the MAC circuit, be robust to the variation of the resistive devices, and perform the MAC operation once a predetermined on-off ratio of the resistive devices is guaranteed even if the on-off ratio is relatively small. Hereinafter, a description will be given of a MAC circuit configured as a non-volatile element to perform an operation of a neural network.

The MAC circuit may be a circuit that outputs a value obtained by accumulating multiplication results. The MAC circuit may include a plurality of multipliers and an output line connected to each of the plurality of multipliers. A description will be given of one multiplier, e.g., a multiplier 100 included in the MAC circuit with reference to FIG. 1.

The multiplier 100 may include a field-effect transistor 110, a pair of resistive devices 121 and 122, and a capacitor 130. In addition, the multiplier 100 may be connected to an output line 140. For example, the output line 140 may be connected to one end of the capacitor 130 of a multiplier. As described below, the capacitor 130 may charge and discharge an electric charge by receiving a voltage corresponding to a value calculated by multiplying an input value corresponding to a combination of input voltages applied to the multiplier 100 by a weight written on the multiplier 100 according to a combined resistance value of the pair of resistive devices 121 and 122. Also, the output line 140 may output a voltage based on an accumulation of electric charges charged to and discharged from each capacitor of the plurality of multipliers included in the MAC circuit.

The field-effect transistor 110 may apply an intermediate voltage $V_{mid}$ to a node 101 in which the pair of resistive devices 121 and 122 are connected to each other. The field-effect transistor 110 may be connected to each of the pair of resistive devices 121 and 122 in the node 101. The field-effect transistor 110 may be, for example, an n-channel metal-oxide semiconductor field-effect (NMOS) transistor or a p-channel metal-oxide semiconductor field-effect (PMOS) transistor. To a gate terminal of the field-effect transistor 110, a word line (WL) may be connected. For example, the word line may be a line connected to a gate terminal of a field-effect transistor included in each of the plurality of multipliers. A reference voltage $V_{DD}$ may be input to the word line, so that the reference voltage $V_{DD}$ is applied to the gate terminal of the field-effect transistor connected to the word line. When the reference voltage is applied to the gate terminal, the field-effect transistor may be turned on.

Each of the pair of resistive devices 121 and 122 may be a resistive device that may have various resistance values. A first resistive device (for example, the resistive device 121) and a second resistive device (for example, the resistive device 122) may be connected to each other through the node 101. One end of the first resistive device 121 may be connected to the node 101, and the other end may be connected to a positive input terminal (INP) 151. One end of the second resistive device 122 may be connected to the node 101, and the other end may be connected to a negative input terminal (INN) 152. In the following description, the positive input terminal may also be referred to as a "first input terminal" and the negative input terminal may also be referred to as a "second input terminal."

Each of the pair of resistive devices 121 and 122 may be a resistive device that may have various resistance values. Each of the pair of resistive devices 121 and 122 may be a variable-resistance device. Each of the pair of resistive devices 121 and 122 may be, for example, one of the RRAM and the MRAM. As an example, the RRAM may be a kind of a non-volatile memory device which has a structure with an insulation film between two metal plates so that a resistance value is changed based on a voltage applied to both ends of the device. For example, based on a voltage applied to an outside, the RRAM may be in a high resistance state (HRS) to have a high resistance value or a low resistance state (LRS) to have a low resistance value. As another example, the MRAM may also be a non-volatile memory device and, based on a voltage applied to an outside, may be in a parallel state to have a high resistance value or an anti-parallel state to have a low resistance value. However, a type of the resistive device is not limited to the foregoing examples, and a resistive device capable of having a plurality of resistance values may also be used for the MAC circuit.

The MAC circuit may determine resistance values of the pair of resistive devices 121 and 122 by applying a voltage to both ends of each of the pair of resistive devices 121 and 122 for each multiplier. A resistance value of the first resistive device 121 may be determined based on the input voltage applied to the node 101 and the weight setting voltage applied to the first input terminal 151. Likewise, a resistance value of the second resistive device 122 may be determined based on the input voltage applied to the node 101 and the weight setting voltage applied to the negative input terminal 152. When the field-effect transistor 110 is turned on, the field-effect transistor 110 may apply the intermediate voltage $V_{mid}$ to the node 101 to determine the resistance values of the pair of resistive devices 121 and 122. The resistance value of the first resistive device 121 may be determined based on the intermediate voltage $V_{mid}$ applied to one end connected to the node 101, and the resistance value of the second resistive device 122 may be determined based on the intermediate voltage $V_{mid}$ applied to one end connected to the node 101 and a weight setting voltage applied to the other end. In this case, the weight setting voltage applied to the first input terminal 151 connected to the other end of the first resistive device 121 may be the same as or different from the weight setting voltage applied to the second input terminal 152 connected to the other end of the second resistive device 122.

A capacitor C 130 may be connected to each of the pair of resistive devices 121 and 122 and the field-effect transistor 110, and may be charged and discharged with an electric charge by receiving a voltage. For example, the capacitor 130 may be charged and discharged with the electric charge by receiving a voltage generated in the node 101. For example, after or when the individual resistance values of the pair of resistive devices 121 and 122 are determined, the capacitor 130 may be charged and discharged with the electric charge by receiving the voltage generated in the node 101 based on input voltages individually applied to the other ends of the pair of resistive devices and a combined resistance value of the pair of resistive devices 121 and 122.

FIG. 2 is a flowchart illustrating an example of a computing method using a MAC circuit.

In operation 210, a MAC circuit may write a weight corresponding to a combined resistance value of a pair of resistive devices by determining resistance values of the pair of resistive devices for each of a plurality of multipliers.

For a corresponding multiplier among the plurality of multipliers, the MAC circuit may apply an intermediate voltage $V_{mid}$ to one end of each of a pair of resistive devices included in the corresponding multiplier and apply a weight setting voltage to the other end. The MAC circuit may apply the intermediate voltage $V_{mid}$ to one ends of the pair of resistive devices using a field-effect transistor and apply the weight setting voltage to the other ends of the pair of resistive devices using input terminals included in the corresponding multiplier. As described below, a combined resistance value of the pair of resistive devices may correspond to one weight, and the MAC circuit may write the weight corresponding to the combined resistance values of the pair of resistive devices for each of the plurality of multipliers.

In operation 220, the MAC circuit may precharge a capacitor at a predetermined voltage for each of the plurality of multipliers.

After or when the resistance values of the pair of resistive devices are determined, the MAC circuit may apply the predetermined voltage to an output line connected to capacitors included in the plurality of multipliers. Through this, the predetermined voltage may be applied to one ends of capacitors included in each of the plurality of multipliers. In addition, the MAC circuit may apply the predetermined voltage to input terminals for each of the plurality of multipliers. Through this, the predetermined voltage may be applied to the other ends of the capacitors included in the plurality of multipliers. As such, the MAC circuit may apply the predetermined voltage to both ends of the capacitor for each of the plurality of multipliers. The predetermined voltage may be, for example, a read voltage $V_{read}$. The read voltage $V_{read}$ may be a voltage for reading the resistance values of the pair of resistive devices.

In operation 230, the MAC circuit may apply an input value by applying the input voltages to input terminals for each of the plurality of multipliers.

The MAC circuit may respectively apply input voltages to the input terminals for each of the plurality of multipliers. As described below, a combination of the input voltages may correspond to one input value, and the MAC circuit may apply an input value corresponding to the combination of the input voltages for each of the plurality of multipliers.

In addition, a capacitor of a multiplier may receive a voltage corresponding to a value obtained by multiplying an input value corresponding to a combination of input voltages applied to the corresponding multiplier by a weight corresponding to a combination of resistance values of a pair of resistive devices included in the corresponding multiplier, and be charged and discharged with an electric charge based on the received voltage. Also, an output line may perform a MAC operation by outputting a voltage based on the electric charge charged to or discharged from each of the plurality of multipliers.

Figure 3A:
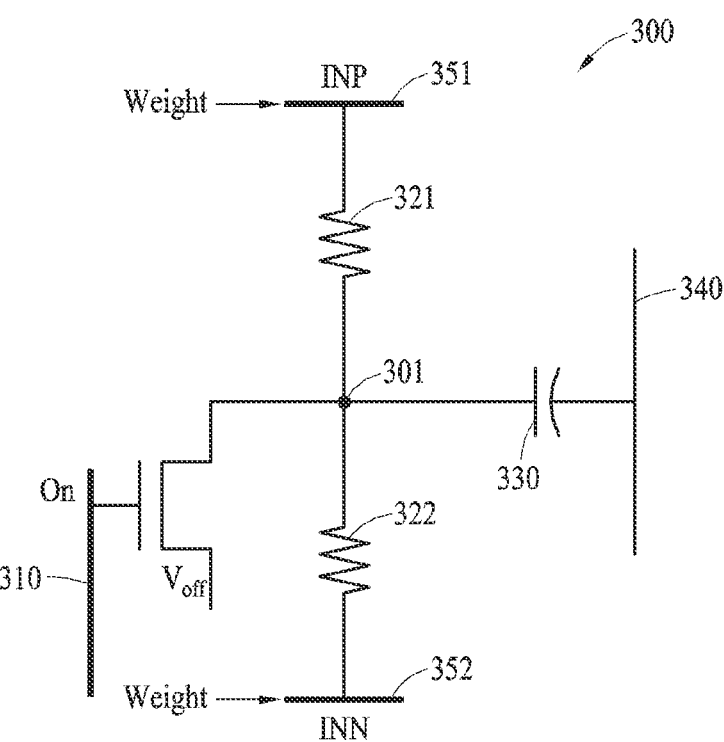
FIGS. 3A and 3B illustrate an example of a process of writing weights on a multiplier by a MAC circuit.

FIG. 3A is a diagram illustrating an example of a process of writing, by a MAC circuit, a weight on a multiplier.

A MAC circuit may write a weight for one multiplier 300 among a plurality of multipliers. The MAC circuit may determine resistance values of a first resistive device 321 and a second resistive device 322. A resistance value of a resistive device may change based on a voltage applied to both ends of the resistive device.

In an example, the resistive device may enter an on state or an off state based on a voltage applied to both ends of the resistive device. In the on state, the resistive device may have a first resistance value that is a relatively low resistance value. In the off state, the resistive device may have a second resistance value that is a relatively high resistance value. As an example, when the resistive device is an RRAM, the on state may correspond to a low resistance state (LRS) in which the RRAM has a low resistance value, and the off state may correspond to a high resistance state (HRS) in which the RRAM has a high resistance value. As another example, when the resistive device is an MRAM, the on state may correspond to an anti-parallel state in which the MRAM has a low resistance value, and the off state may correspond to a parallel state in which the MRAM has a high resistance value.

The MAC circuit may write a weight according to a combined resistance value of a pair of resistive devices, for example, the first resistive device 321 and the second resistive device 322 on the multiplier 300. For example, the weight may be one of ternary values of +1, 0, and −1. A non-limiting example of the weight written according to the combined resistance value of the pair of resistive devices will be further described in greater detail with reference to FIG. 4.

The MAC circuit may determine resistance values of the pair of resistive devices 321 and 322 by applying a voltage to both ends of each of the pair of resistive devices 321 and 322. The MAC circuit may apply an intermediate voltage $V_{mid}$ to a node 301 connected to one ends of the first resistive device 321 and the second resistive device 322 using a field-effect transistor 310. As described above, a gate terminal of the field-effect transistor 310 may access a word line. When a reference voltage $V_{DD}$ is input to the word line, the gate terminal of the field-effect transistor 310 accessing the word line may receive the reference voltage $V_{DD}$. When the reference voltage $V_{DD}$ is applied to the gate terminal of the field-effect transistor 310, the field-effect transistor 310 may be turned on.

A first terminal of the field-effect transistor 310 may be a terminal connected to a source line. A second terminal of the field-effect transistor 310 may be a terminal connected to the node 301. The first terminal of the field-effect transistor may be one of a drain terminal and a source terminal, and the second terminal may be a remaining terminal. The intermediate voltage $V_{mid}$ may be input to the source terminal.

The MAC circuit may apply the reference voltage $V_{DD}$ to the gate terminal of the field-effect transistor 310 through the word line, thereby turning on the field-effect transistor. In a state in which the field-effect transistor 310 is turned on, the MAC circuit may apply the intermediate voltage $V_{mid}$ to the first terminal of the field-effect transistor 310 through the source line, thereby changing a voltage of the second terminal of the field-effect transistor 310 to the intermediate voltage $V_{mid}$. For example, when the reference voltage $V_{DD}$ is applied to the gate terminal of the field-effect transistor 310, the field-effect transistor 310 may operate in a saturation region. When the field-effect transistor 310 operates in the saturation region, a low resistance path may be provided between the first terminal and the second terminal in the field-effect transistor 310 and may act as a short circuit. Through this, the intermediate voltage $V_{mid}$ applied to the first terminal may be changed to the voltage of the second terminal, and the field-effect transistor 310 may apply the intermediate voltage $V_{mid}$ to the node 301 connected to the second terminal.

In addition, the weight setting voltages may be applied to the other ends of the pair of resistive devices 321 and 322, so that the resistance values of the pair of resistive devices 321 and 322 are determined. For example, one end of the first resistive device 321 may be connected to the node 301 and the other end may be connected to a first input terminal 351. The MAC circuit may apply the weight setting voltage to the first input terminal 351, and the weight setting voltage may be applied from the first input terminal 351 to the other end of the first resistive device 321. Likewise, one end of the second resistive device 322 may be connected to the node 301, and the other end may be connected to a second input terminal 352. The MAC circuit may apply the weight setting voltage to the second input terminal 352, and the weight setting voltage may be applied from the second input terminal 352 to the other end of the second resistive device 322. For example, the weight setting voltage applied to the first input terminal 351 may be the same as or different from the weight setting voltage applied to the second input terminal 352 in magnitude.

As such, the resistance value of the first resistive device 321 may be determined based on the intermediate voltage $V_{mid}$ applied to the one end connected to the node 301 and a first weight setting voltage applied to the other end connected to the first input terminal 351. The resistance value of the second resistive device 322 may be determined based on the intermediate voltage $V_{mid}$ applied to the one end connected to the node 301 and a second weight setting voltage applied to the other end connected to the second input terminal 352.

Figure 3B:
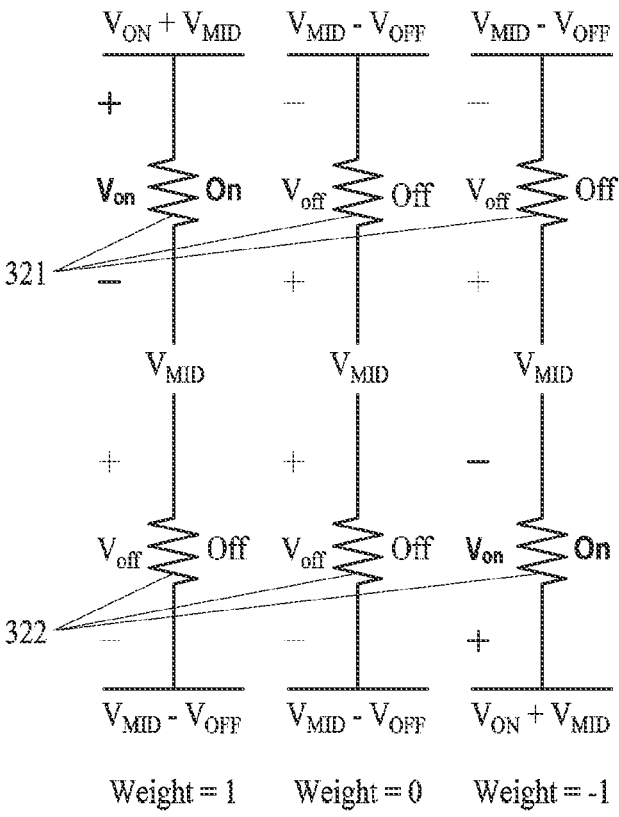

Referring to FIG. 3B, the MAC circuit may determine the resistance values of the pair of resistive devices 321 and 322 by applying the voltage to both ends of each of the pair of resistive devices 321 and 322 and write the weight according to the combined resistance value of the pair of resistive devices on the multiplier 300 including the pair of resistive devices 321 and 322.

For example, when a high voltage having a magnitude corresponding to that of a turn-on voltage $V_{on}$ in a voltage applied to one end of a resistive device is applied to the other end of the resistive device, the resistive device may enter a turn-on state so as to have a first resistance value. Also, when a low voltage having a magnitude corresponding to that of a turn-off voltage $V_{off}$ in a voltage applied to one end of a resistive device is applied to the other end of the resistive device, the resistive device may enter a turn-off state so as to have a second resistance value. The first resistance value may be a relatively low resistance value compared to the second resistance value. A ratio of the first resistance value to the second resistance value may be greater than or equal to a threshold ratio. The first resistance value may be a resistance value less than a threshold resistance value. The second resistance value may be a resistance value greater than the threshold resistance value. The turn-on voltage $V_{on}$ and the turn-off voltage $V_{off}$ may vary based on a type of resistive device.

For example, when the resistive device is an RRAM, when a high voltage having a magnitude corresponding to that of the turn-on voltage $V_{on}$ in a voltage applied to one end of the resistive device is applied to other end, a conductive path may be formed in the resistive device so that the resistive device enters the low resistance state (low resistance state, LRS). In this case, the resistive device may have a relatively small resistance value. In contrast, when a low voltage having a magnitude corresponding to that of the turn-off voltage $V_{off}$ in a voltage applied to one end of the resistive device is applied to the other end, a conductive path may not be formed in the resistive device, so that the resistive device may enter a high resistance state (high resistance state, HRS). In this case, the resistive device may have a relatively high resistance value.

The MAC circuit may write a weight according to the combined resistance value of the pair of resistive devices 321 and 322 on the multiplier 300 including the pair of resistive devices 321 and 322. The combined resistance value of the pair of resistive devices may correspond to one ternary value of ternary values representing weights of connection lines between layers included in a neural network as described with reference to FIG. 9, as a non-limiting example. When the resistive device has one of the first resistance value and the second resistance value, the MAC circuit may write a weight of one ternary value of ternary values '1', '0', and '-1' on the multiplier. However, the weight to be written by the multiplier is not limited to the ternary value. As described with reference to FIG. 7, the resistive device may enter three or more states and thus, have three or more resistance values. In such cases, the MAC circuit may write various weights according to a combined resistance value on a multiplier.

The MAC circuit may match a weight representing '1' to a case in which the resistance values of the first resistive device 321 and the second resistive device 322 are determined as the first resistance value and the second resistance value. The MAC circuit may cause the first resistive device 321 to enter the turn-on state and cause the second resistive device 322 to enter the turn-off state, so that the weight representing '1' is written. For example, the MAC circuit may turn on the field-effect transistor 310 and apply the intermediate voltage $V_{mid}$ to the node 301 through the source line. In addition, the MAC circuit may apply the weight setting voltage (e.g., the first weight setting voltage) to the first input terminal 351 connected to the other end of the first resistive device. In this example, the weight setting voltage applied to the first input terminal 351 may be a high voltage $(V_{on}+V_{mid})$ having a magnitude corresponding to that of the turn-on voltage $V_{on}$ in the intermediate voltage $V_{mid}$. The MAC circuit may cause the first resistive device 321 to enter the turn-on state based on the intermediate voltage $V_{mid}$ applied to the one end of the first resistive device 321 and the first weight setting voltage applied to the other end of the first resistive device 321, and determine the resistance value of the first resistive device to be the first resistance value. Also, the MAC circuit may apply the weight setting voltage (e.g., the second weight setting voltage) to the second input terminal 352 connected to the other end of the second resistive device. In this example, the weight setting voltage applied to the second input terminal 352 may be a low voltage $(V_{mid}-V_{off})$ having a magnitude corresponding to that of the turn-off voltage $V_{off}$ in the intermediate voltage $V_{mid}$. The MAC circuit may cause the second resistive device 322 to enter the turn-off state based on the intermediate voltage $V_{mid}$ applied to the one end of the second resistive device 322 and the second weight setting voltage applied to the other end of the second resistive device 322, and determine the resistance value of the second resistive device to be the second resistance value.

The MAC circuit may match the weight representing '0' to a case in which the resistance values of the first resistive device 321 and the second resistive device 322 are determined as the second resistance value. For example, the MAC circuit may apply a low voltage $(V_{mid}-V_{off})$ having a magnitude corresponding to that of the turn-off voltage $V_{off}$ in the intermediate voltage $V_{mid}$ to the first input terminal 351 as the weight setting voltage, and apply a low voltage $(V_{mid}-V_{off})$ having a magnitude corresponding to that of the turn-off voltage $V_{off}$ in the intermediate voltage $V_{mid}$ to the second input terminal 352 as the weight setting voltage.

Further, the MAC circuit may match the weight representing '-1' to a case in which the resistance values of the first resistive device 321 and the second resistive device 322 are determined as the second resistance value and the first resistance value, respectively. For example, the MAC circuit may apply a low voltage $(V_{mid}-V_{off})$ having a magnitude corresponding to that of the turn-off voltage $V_{off}$ in the intermediate voltage $V_{mid}$ to the first input terminal 351 as the weight setting voltage, and apply a high voltage $(V_{on}+V_{mid})$ having a magnitude corresponding to that of the turn-on voltage $V_{on}$ in the intermediate voltage $V_{mid}$ to the second input terminal 352 as the weight setting voltage.

In another example, the MAC circuit may match the weight representing '0' to a case in which the resistance values of the first resistive device 321 and the second resistive device 322 are determined as the first resistance value. For example, the MAC circuit may apply a high voltage $(V_{on}+V_{mid})$ having a magnitude corresponding to that of the turn-on voltage $V_{on}$ in the intermediate voltage $V_{mid}$ to the first input terminal 351 and the second input terminal 352. In this example, a combination of resistance values corresponding to the weight representing '1' and the weight representing '−1' is the same as the foregoing examples.

In an example, the MAC circuit may simultaneously determine the resistance values of the pair of resistive devices 321 and 322. For example, the MAC circuit may turn a transistor on, apply the intermediate voltage $V_{mid}$ to the node 301, and apply the weight setting voltages to the first input terminal 351 and the second input terminal 352 at one time, thereby simultaneously changing the resistance values of the pair of resistive devices 321 and 322. In other words, the MAC circuit may simultaneously determine states of the pair of resistive devices. In another example, the MAC circuit may determine states of the pair of resistive devices 321 and 322 throughout two cycles. For example, the MAC circuit may apply the weight setting voltage to the first input terminal 351, thereby determining the resistance value of the first resistive device 321 first. Also, after or when the resistance value of the first resistive device 321 is determined, the MAC circuit may apply the weight setting voltage to the second input terminal 352, thereby determining the second resistive device 322.

Figure 4:
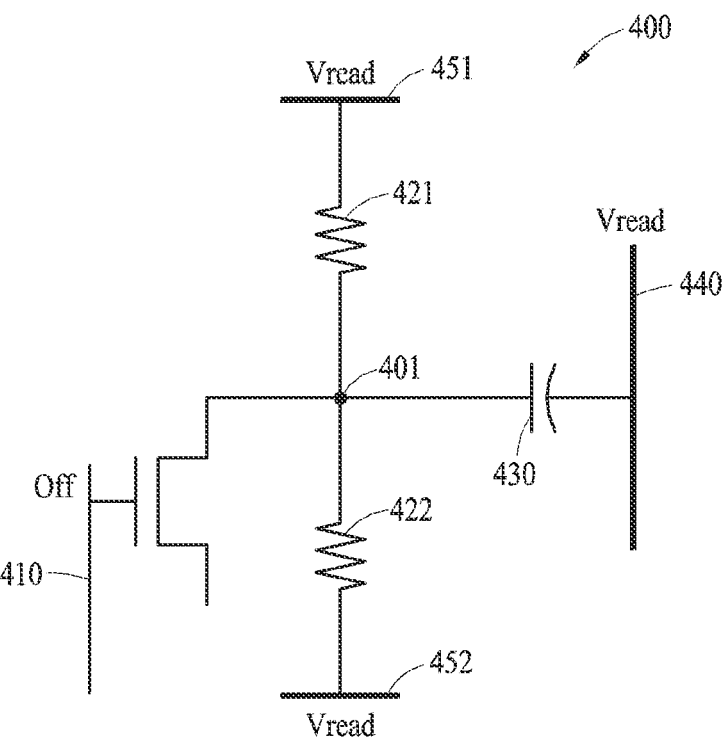
FIG. 4 illustrates an example of a process of precharging both ends of a capacitor at a preset voltage before a MAC circuit applies an input value to a multiplier.

FIG. 4 illustrates an example of a process of precharging both ends of a capacitor at a preset voltage before a MAC circuit applies an input value to a multiplier.

A MAC circuit may determine resistance values of a pair of resistive devices, for example, a first resistive device 421 and a second resistive device 422, write a weight on a multiplier, and then apply an input value to the corresponding multiplier. The input value applied to the MAC circuit may be determined based on input voltages individually applied to input terminals connected to the other ends of the pair of resistive devices 421 and 422. Before the input voltages are applied to the pair of resistive devices 421 and 422, the MAC circuit may apply a predetermined voltage to input terminals 451 and 452 connected to the other ends of the pair of resistive devices 421 and 422 and apply the predetermined voltage to an output line 440, thereby precharging both ends of a capacitor 430 at the predetermined voltage.

The MAC circuit may apply input voltages to the other ends of the pair of resistive devices 421 and 422 through the input terminals, thereby precharging voltages of both ends of a capacitor 430 before an input value is applied to a multiplier. The predetermined voltage may be, for example, a read voltage $V_{read}$ but is not limited thereto. The read voltage $V_{read}$ may be a voltage for reading resistance values of a pair of resistive devices 421 and 422 and may have a relatively small magnitude compared to weight setting voltages.

The MAC circuit may turn off a field-effect transistor 410 after or when the resistance values of the pair of resistive devices 421 and 422 are determined. For example, the MAC circuit may suspend supplying a reference voltage to a word line connected to a gate terminal of the field-effect transistor 410. When the supplying of the reference voltage to the word line is suspended, a voltage may not be applied to the gate terminal of the field-effect transistor 410 so the field-effect transistor 410 is turned off. In addition, the MAC circuit may apply the read voltage $V_{read}$ to a first input terminal 451 connected to the other end of the first resistive device 421 and apply the read voltage $V_{read}$ to a second input terminal 452 connected to the other end of the second resistive device 422. Also, the MAC circuit may apply the read voltage $V_{read}$ to an output line 440 connected to the capacitor 430.

The MAC circuit may apply the read voltage $V_{read}$ to the first input terminal 451 and the second input terminal 452, thereby applying the read voltage $V_{read}$ to a node 401 between the first input terminal 451 and the second input terminal 452. When the voltage applied to the first input terminal 451 and the second input terminal 452 is divided based on the resistance values of the pair of resistive devices 421 and 422, a magnitude of voltage to be applied to the node 401 may be determined. In this case, because the read voltage $V_{read}$ is equally applied to the first input terminal 451 and the second input terminal 452, the read voltage $V_{read}$ may be applied to the node 401 irrespective of the resistance values of the first resistive device 421 and the second resistive device 422. As a result, the read voltage $V_{read}$ may be applied to one end of the capacitor 430 connected to the node 401 and the other end of the capacitor 430 connected to the output line 440. That is, before an input value is applied to a multiplier 400, the MAC circuit may bring the capacitor 430 to an initialized state in which the capacitor 430 is not charged and discharged.

Figure 5A:
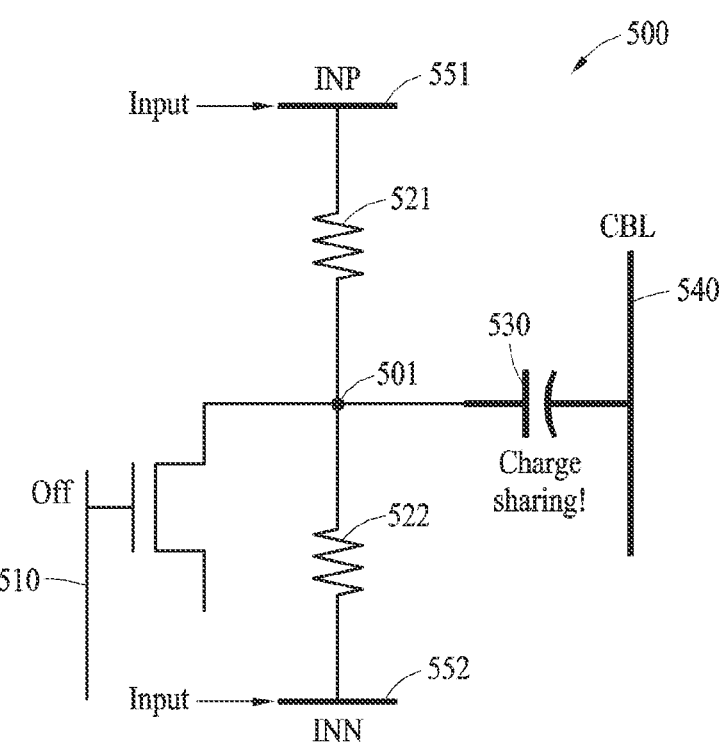
FIGS. 5A and 5B illustrate an example of a process of applying an input value to a multiplier by a MAC circuit.

FIG. 5A is a diagram illustrating an example of a process of applying an input value to a multiplier by a MAC circuit.

After or when resistance values of a pair of resistive devices (for example, a first resistive device 521 and a second resistive device 522) are determined, a MAC circuit may individually apply input voltages to input terminals, for example, a first input terminal 551 and a second input terminal 552 connected to the other ends of the pair of resistive devices 521 and 522 and apply input values according to combined input voltages to a multiplier. The combined input voltages may correspond to one ternary value among ternary values representing output values of a node included in a layer of a neural network as described with reference to FIG. 9, as a non-limiting example. According to an input voltage applied to the first input terminal 551 and an input voltage applied to the second input terminal 552, the MAC circuit may apply one ternary value among ternary values of '1', '0', and −1' to a multiplier 500 as an input value. However, an input to be applied by the MAC circuit is not limited to a ternary value. As described with reference to FIG. 8, various magnitudes of input voltages may be applied to the first input terminal and the second input terminal, and accordingly, in the MAC circuit, various input values based on combined input voltages may be applied to the multiplier 500.

Figure 5B:
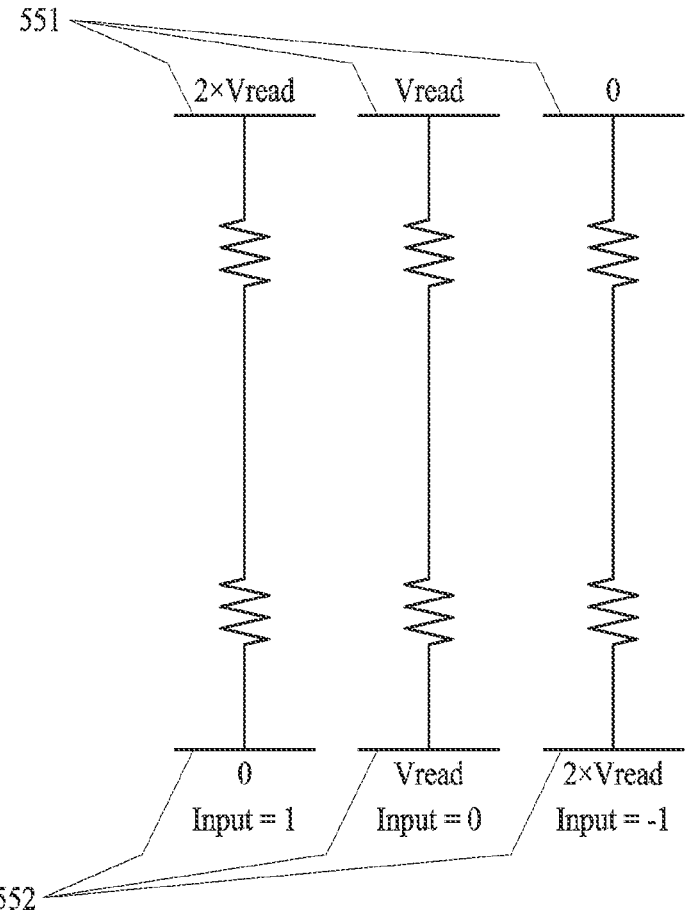

Referring to FIG. 5B, the MAC circuit may match an input value representing '1' to a case in which $2 \times V_{read}$ and a ground voltage (0) are applied to the first input terminal 551 and the second input terminal 552, respectively. In addition, the MAC circuit may match an input value representing '0' to a case in which $V_{read}$ is applied to the first input terminal 551 and the second input terminal 552. Also, the MAC circuit may match an input value representing '−1' to a case in which the ground voltage and $2 \times V_{read}$ are applied to the first input terminal 551 and the second input terminal 552, respectively.

Referring back to FIG. 5A, when input voltages are applied to the input terminals 551 and 552 after or when the resistance values of the pair of resistive devices 521 and 522 are determined, a voltage may be generated in a node 501. The voltage generated in the node 501 may correspond to a value calculated by multiplying the input value applied to the multiplier 500 by the written weight. In other words, the MAC circuit may generate, in the node 501, a voltage corresponding to a value calculated by multiplying an input value corresponding to a combination of input voltages individually applied to the pair of resistive devices 521 and 522 by a weight corresponding to a combination of the pair of resistive devices 521 and 522.

For example, the voltage may be generated in the node 501 when the voltages applied to the first input terminal 551 and the second input terminal 552 are divided based on the determined resistance values of the pair of resistive devices 521 and 522. Table 1 shows voltages generated in the node 501 based on an applied input value and a weight written on the multiplier 500.

TABLE 1

| First re-sistive device | Second re-sistive device | Weight (ternary value) | First input ter-minal | Second input ter-minal | Input (ternary value) | Weight × input value | Node vol-tage |
|---|---|---|---|---|---|---|---|
| ON | OFF | 1 | $2 \times V_{read}$ | 0 | 1 | 1 | $2 \times V_{read}$ |
| ON | OFF | 1 | $V_{read}$ | $V_{read}$ | 0 | 0 | $V_{read}$ |
| ON | OFF | 1 | 0 | $2 \times V_{read}$ | −1 | −1 | 0 |
| OFF | OFF | 0 | $2 \times V_{read}$ | 0 | 1 | 0 | $V_{read}$ |
| OFF | OFF | 0 | $V_{read}$ | $V_{read}$ | 0 | 0 | $V_{read}$ |
| OFF | OFF | 0 | 0 | $2 \times V_{read}$ | −1 | 0 | $V_{read}$ |
| OFF | ON | −1 | $2 \times V_{read}$ | 0 | 1 | −1 | 0 |
| OFF | ON | −1 | $V_{read}$ | $V_{read}$ | 0 | 0 | $V_{read}$ |
| OFF | ON | −1 | 0 | $2 \times V_{read}$ | −1 | 1 | $2 \times V_{read}$ |

As shown in Table 1, a weight having a ternary value may be determined based on resistance values determined based on states of (for example, turn-on state (ON) or turn-off state (OFF)) of the first resistive device 521 and the second resistive device 522. In addition, an input value having a ternary value may be determined based on input voltages applied to the first input terminal 551 and the second input terminal 552.

A voltage generated in the node 501 may be determined based on input voltages applied to the input terminals 551 and 552 and the determined resistance values of the pair of resistive devices 521 and 522.

As an example, the first resistive device 521 may enter the turn-on state, and the second resistive device 522 may enter the turn-off state. In this example, because a first resistance value of the first resistive device 521 is smaller than a second resistance value of the second resistive device 522, the first resistive device 521 may operate like a short circuit. In addition, a voltage generated in the node 501 may have substantially the same magnitude as that of the input voltage applied to the first input terminal 551.

As another example, the first resistive device 521 may enter the turn-off state, and the second resistive device 522 may enter the turn-on state. In this example, because a second resistance value of the first resistive device 521 is greater than a first resistance value of the second resistive device 522, the second resistive device 522 may operate like a short circuit. In addition, a voltage generated in the node 501 may have substantially the same magnitude as that of the input voltage applied to the second input terminal 552.

Referring to Table 1, the voltage generated in the node 501 of the multiplier 500 may correspond to a value calculated by multiplying a weight corresponding to a ternary value by an input value corresponding to a ternary value. For example, when a value obtained by multiplying a weight and an input value is '1', a magnitude of voltage generated in the node 501 is $2 \times V_{read}$. In addition, when a value obtained by multiplying a weight and an input is '0', a magnitude of voltage generated in the node 501 is $V_{read}$. Also, when a value obtained by multiplying a weight and an input is '−1', no or little voltage may be generated in the node 501.

Figure 6:
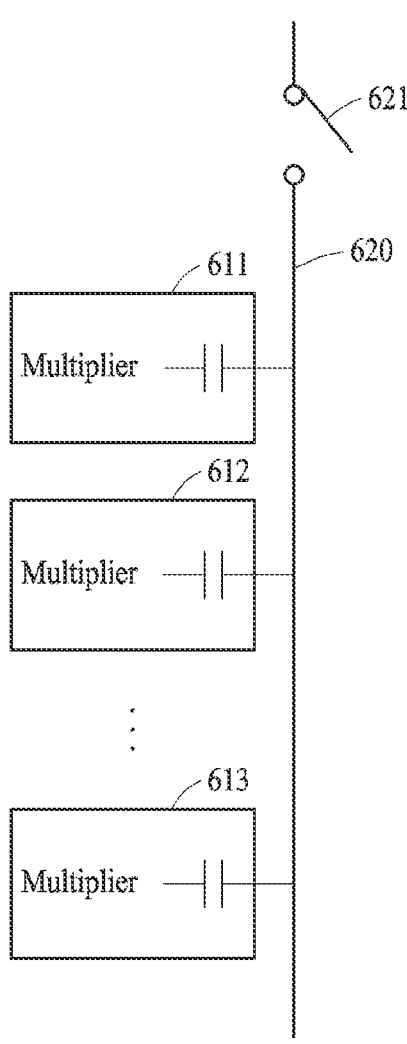
FIG. 6 illustrates an example of a structure of a MAC circuit.

FIG. 6 illustrates an example of a structure of a MAC circuit.

A MAC circuit 600 may include a plurality of multipliers 611, 612, and 613 and an output line 620. Each of the plurality of multipliers 611, 612, and 613 may have a structure and an operation method as described with reference to FIGS. 3A through 5B. The output line 620 may be connected to each of the plurality of multipliers 611, 612, and 613. The output line 620 may output a voltage based on an electric charge charged to and discharged from each of the plurality of multipliers 611, 612, and 613.

The output line 620 may be connected to one end of a capacitor included in each of the plurality of multipliers 611, 612, and 613. The output line 620 may output a voltage based on an accumulation of electric charges charged to and discharged from the capacitors included in the plurality of multipliers 611, 612, and 613 through capacitive coupling. After or when a weight for each of the plurality of multipliers 611, 612, and 613 is written, a switch 621 may be turned on, so that the output line 620 is precharged at the read voltage $V_{read}$. After or when the output line 620 is precharged at the read voltage, the switch 621 may be turned off. After or when the switch 621 is turned off, each of the plurality of multipliers 611, 612, and 613 may charge and discharge the capacitor with the electric charge based on a voltage output according to a product of the weight and an input value. In addition, the electric charge charged to and discharged from the capacitor included in each of the plurality of multipliers 611, 612, and 613 may be accumulated in the output line 620, so that a voltage based on the accumulated electric charges is output.

For example, the capacitor included in the multiplier 611 may be charged and discharged with the electric charge by receiving a voltage generated in a node of the multiplier 611 and share the electric charge with the output line 620. Likewise, the capacitor included in the multiplier 612 may be charged and discharged with the electric charge by receiving a voltage generated in a node of the multiplier 612 and share the electric charge with the output line 620. As such, through the capacitive coupling, the output line 620 may output the voltage based on the accumulation of the electric charges charged to or discharged from the capacitor of each of the multipliers 611, 612, and 613.

Further, the MAC circuit may include a plurality of output lines. A structure in which the plurality of output lines is arranged may also be referred to as a "memory array." For example, the plurality of output lines may be connected to the plurality of multipliers. For example, each of the plurality of output lines may be connect to a respective plurality of multipliers. Among the plurality of output lines, a corresponding output line may output a voltage based on an accumulation of electric charges charged to and discharged from the plurality of multipliers connected to the corresponding output line. The memory array may perform in-memory computing based on a voltage output from each of the plurality of output lines included in the memory array.

The MAC circuit may generate a voltage in a node by using a scheme of dividing a voltage by resistance values of a pair of resistive devices, and charge and discharge a capacitor with an electric charge based on the generated voltage. The MAC circuit may generate a voltage in a node of a multiplier through voltage dividing. Thus, even if an on-off ratio of resistive devices is relatively small, once the on-off ratio is greater than or equal to a threshold ratio, the voltage generated in the node may be similar to a voltage corresponding to a value obtained by multiplying an input value by a weight. Here, the on-off ratio may be a ratio of a first resistance value that is a resistance value of a resistive device being in an on state to a second resistance value that is a resistance value of a resistive device being in an off state. In addition, the MAC circuit of one or more embodiments may generate the voltage in the node through voltage dividing and thus, is relatively robust to a variation in the resistance value of the resistive device. In other words, even if the resistance value of the resistive device is changed to some extent, the voltage generated in the node may not be significantly changed because the voltage is determined based on a ratio between resistance values of a first resistive device and a second resistive device. Also, the MAC circuit of one or more embodiments may output the voltage based on the accumulation of the electric charges charged to and discharged from the capacitor through the capacitive coupling and thus, may ensure linearity between a final output voltage and a value calculated according to a MAC operation.

Figure 7:
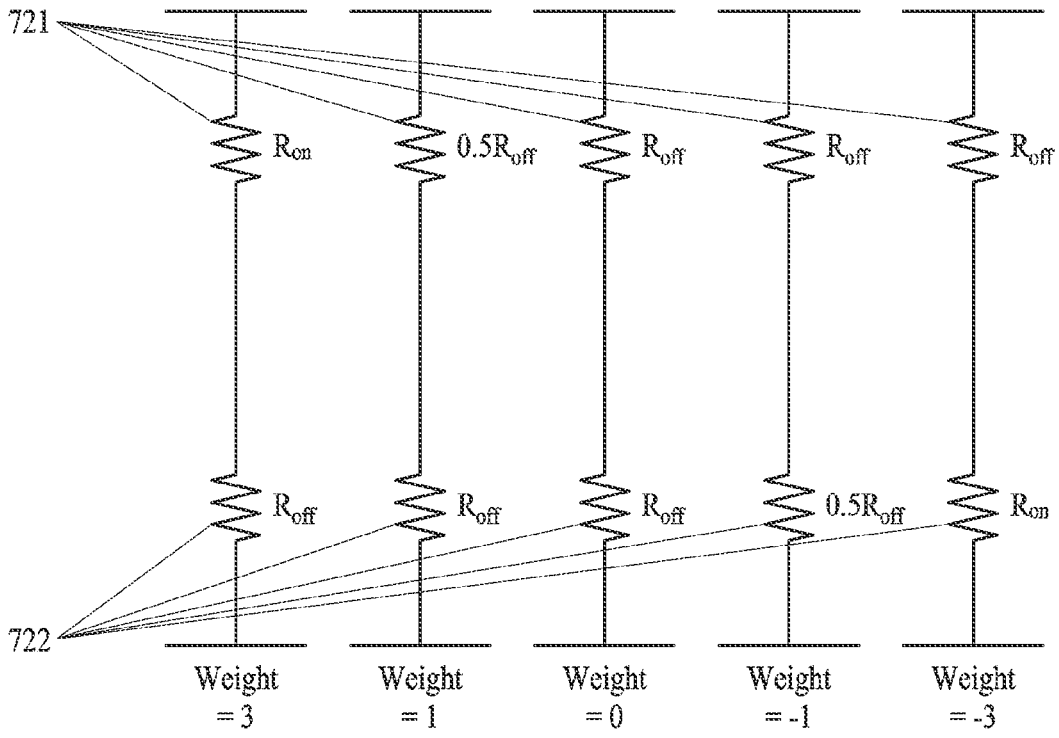
FIG. 7 illustrates an example of a weight to be written on a multiplier by a MAC circuit.

FIG. 7 illustrates an example of a weight to be written on a multiplier by a MAC circuit.

A MAC circuit may write a weight according to a combined resistance value of a pair of resistive devices on a multiplier. A resistive device may enter an intermediate state different from a turn-on state and a turn-off state. When the resistive device enters the intermediate state, the resistive device may have a third resistance value. Using a third state that the resistive device enters, the MAC circuit may be enabled to write a multibit weight, which is expanded from a weight of a ternary value, on a multiplier.

For example, referring to FIG. 7, the resistive device may enter the intermediate state by a voltage applied to both ends. The resistive device may have the third resistance value in the intermediate state. For example, the third resistance value may be, but not be limited to, a value greater than a first resistance value Ron and less than a second resistance value $R_{off}$. The third resistance value may be 0.5 $R_{off}$, half of the second resistance value, but is not limited thereto.

FIG. 7 illustrates a process of writing, by the MAC circuit, a weight representing one of five values, 3, 1, 0, −1, and −3 on a multiplier. The MAC circuit may write a weight representing one of the five values '3', '1', '0', '−1', '−3' on a multiplier according to a combined resistance value of the pair of resistive devices.

In an example, the MAC circuit may match a weight representing '3' to a case in which a first resistive device 721 and a second resistive device 722 are determined as the first resistance value Ron and the second resistance value $R_{off}$, respectively. The MAC circuit may match a weight representing '1' to a case in which the first resistive device 721 and the second resistive device 722 are determined as the third resistance value 0.5$R_{off}$ and the second resistance value $R_{off}$, respectively. The MAC circuit may match a weight representing '0' to a case in which the first resistive device 721 and the second resistive device 722 are determined as the second resistance value $R_{off}$. The MAC circuit may match a weight representing '−1' to a case in which the first resistive device 721 and the second resistive device 722 are determined as the second resistance value $R_{off}$ and the third resistance value 0.5$R_{off}$, respectively. The MAC circuit may match a weight representing '−3' to a case in which the first resistive device 721 and the second resistive device 722 are determined as the second resistance value $R_{off}$ and the first resistance value Ron, respectively.

The MAC circuit may write a weight representing one of the five values, 3, 1, 0, −1, and −3 on the multiplier according to a combined resistance value of the pair of resistive devices and apply an input value to the multiplier according to combined input voltages. In addition, the MAC circuit may allow a capacitor included in the multiplier to be charged and discharged by receiving a voltage corresponding to a value obtained by multiplying the weight and the input value.

Figure 8:
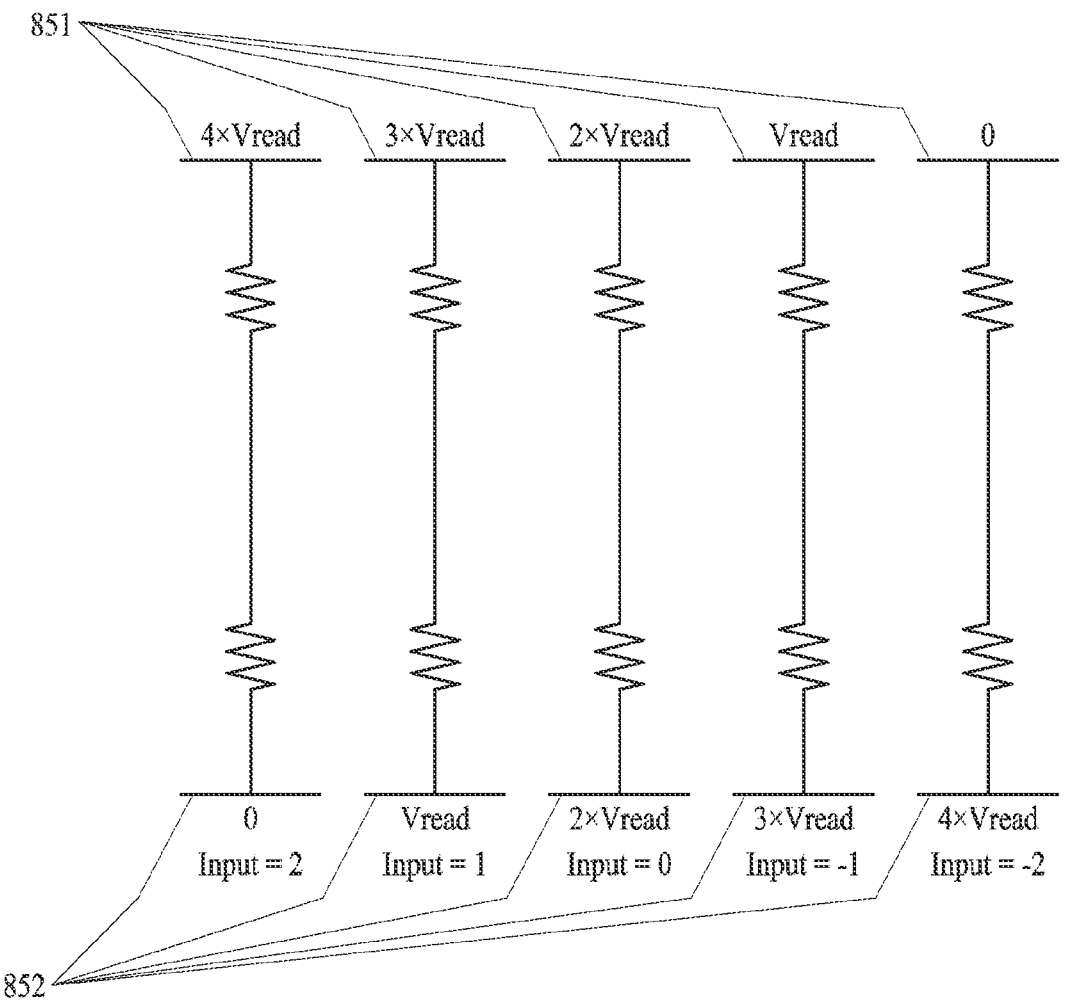
FIG. 8 illustrates an example of an input value to be applied to a multiplier by a MAC circuit.

FIG. 8 illustrates an example of an input value to be applied to a multiplier by a MAC circuit.

A MAC circuit may apply an input value according to combined input voltages to a multiplier. In an example, the MAC circuit may apply a voltage greater than 2×$V_{read}$ as an input voltage. When the MAC circuit applies the voltage greater than 2×$V_{read}$ as the input voltage, a number of bits of the input value may increase. FIG. 8 illustrates a case in which an input voltage of up to 4×$V_{read}$ is to be applied as a simple example. When the input voltage of up to 4×$V_{read}$ is to be applied, an input value representing one of five values, 2, 1, 0, −1, and −2 may be applied to a multiplier.

Referring to FIG. 8, the MAC circuit may match an input value representing '2' to a case in which 4×$V_{read}$ and a ground voltage '0' are applied to a first input terminal 851 and a second input terminal 852, respectively. The MAC circuit may match an input value representing '1' to a case in which 3×$V_{read}$ and $V_{read}$ are applied to the first input terminal 851 and the second input terminal 852, respectively. The MAC circuit may match an input value representing '0' to a case in which 2×$V_{read}$ is applied to the first input terminal 851 and the second input terminal 852. The MAC circuit may match an input value representing '−1' to a case in which $V_{read}$ and 3×$V_{read}$ are applied to the first input terminal 851 and the second input terminal 852, respectively. The MAC circuit may match an input value representing '−2' to a case in which the ground voltage '0' and 4×$V_{read}$ are applied to the first input terminal 851 and the second input terminal 852, respectively. The MAC circuit may write a weight according to a combined resistance value of the pair of resistive devices on the multiplier and apply an input value representing one of the five values, 2, 1, 0, −, 1, and −2 to the multiplier according to the combined input voltages. In addition, the MAC circuit may allow a capacitor included in the multiplier to be charged and discharged by receiving a voltage corresponding to a value obtained by multiplying the weight and the input value.

Figure 9:
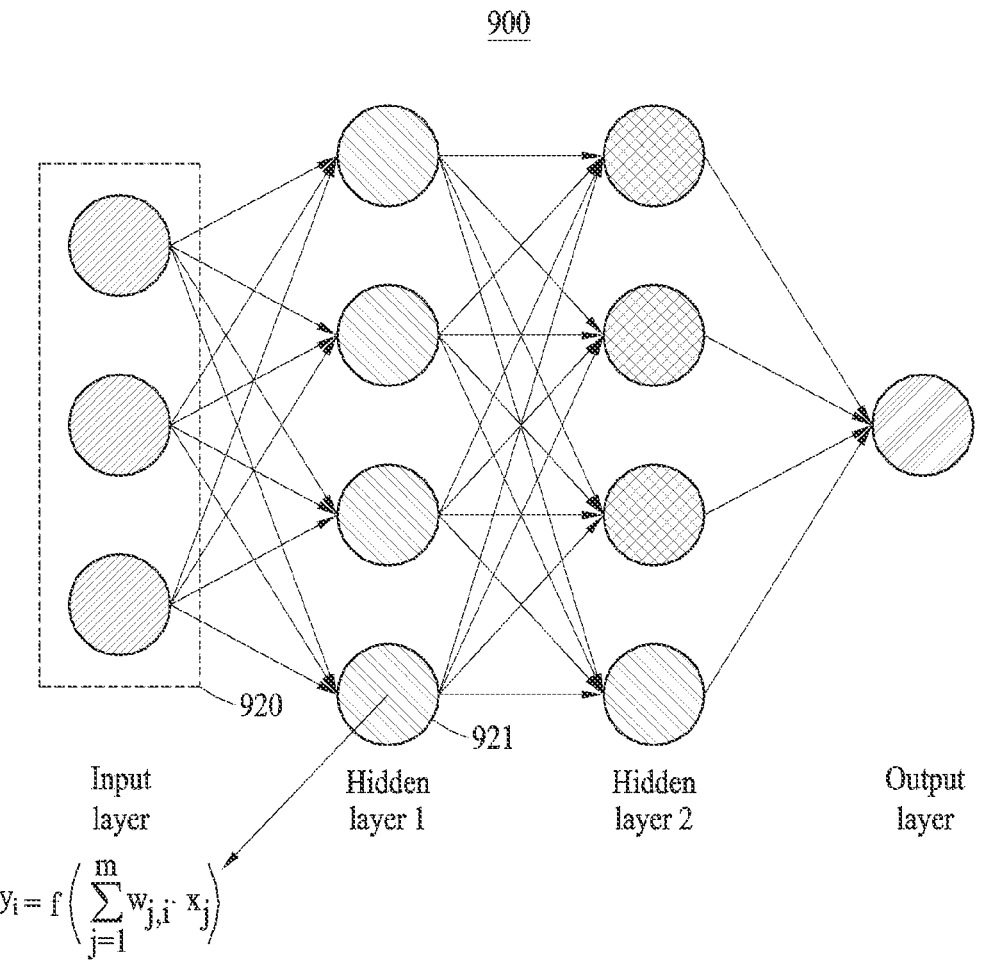
FIG. 9 illustrates an example of a neural network operation to be implemented by a MAC circuit.

FIG. 9 illustrates an example of a neural network operation to be implemented by a MAC circuit.

A neural network 900 may be, for example, a deep neural network (DNN). The DNN may include a fully connected network, a deep convolutional network, and/or a recurrent neural network. The neural network 900 may perform object classification, object recognition, speech recognition, and/or image recognition by mapping input data and output data in a non-linear relationship to each other based on deep learning. Deep learning is a machine learning technique for solving problems such as image or speech recognition from big data sets. In the deep learning, the input data and the output data may be mapped to each other through supervised or unsupervised learning.

Although FIG. 9 illustrates two hidden layers for convenience of description, the neural network 900 may include various numbers of hidden layers (e.g., three or more hidden layers). In addition, although FIG. 9 illustrates that the neural network 900 includes a separate input layer 910 to receive input data, the input data may be directly input to hidden layer 1. In the neural network 900, artificial nodes of layers other than an output layer may be connected to artificial nodes of a next layer through links for transmitting an output signal. The number of links may correspond to the number of artificial nodes included in the next layer.

Each artificial node included in the hidden layer may be input in a weighted form with outputs of artificial nodes included in the previous layer. The weighted input may be referred to as a weighted input, which is obtained by multiplying the output of artificial nodes included in the previous layer by a weight. The weight may be referred to as a parameter of the neural network 900. An activation function may be applied to the sum of weighted inputs and output to the next layer. The activation function may include a sigmoid, a hyperbolic tangent (tanh), and a rectified linear unit (ReLU), and a non-linearity may be formed in the neural network 900 by the activation function. Each artificial node included in the output layer may receive weighted inputs in a form in which outputs of artificial nodes included in a previous layer are weighted.

The MAC circuit described with reference to FIGS. 1 through 8 may be applied to in-memory computing for running a deep-learning algorithm. For example, a calculation of a weighted input transferred between nodes 921 of the neural network 900 may include a MAC operation in which multiplication and addition are repeated. An output of one node 921 of the neural network 900 may be expressed by Equation 1 as shown below.

$$y_i = f\left(\sum_{j=1}^{m} w_{j,i} x_j\right) \qquad \text{Equation 1}$$

Equation 1 may represent an output value $y_i$ of an i-th node 921 for m weighted input values in a predetermined layer. $x_j$ denotes a j-th output value, for example, a node value of a previous layer, and $w_{j,i}$ denotes a weight applied to the i-th node 921 and the j-th output value of the previous layer. $w_{j,i} x_j$ denotes a j-th weighted input among the m weighted input values in terms of the i-th node 921 of the corresponding layer. f( ) denotes an activation function. As shown in Equation 1, for the activation function, cumulative results of multiplication of the node value $x_j$ and the weight $w_{j,i}$ may be used. In other words, a memory access operation that needs to load the appropriate node value $x_j$ and the weight $w_{j,i}$ at a desired time, and a MAC operation for multiplying and adding them may be repeated.

In an example, a combined resistance value of the pair of resistive devices in the MAC circuit may correspond to a weight of a connection line connecting a plurality of nodes in the neural network 900 including a layer including the plurality of nodes. In an example, combined input voltages of the MAC circuit may correspond to an output value $x_j$ of a node in the neural network 900 including a layer including a plurality of nodes. Accordingly, the MAC circuit may perform at least a portion of operations required to run the neural network 900. However, an application of the MAC circuit is not limited to the examples. In addition to the foregoing examples, the MAC circuit may also be used for a computational operation that needs to quickly process a plurality of input data using an analog circuit characteristic at low power.

The multipliers, field-effect transistors, resistive devices, capacitors, output lines, positive input terminals, negative input terminals, first resistive devices, second resistive devices, first input terminals, second input terminals, MAC circuits, switches, multiplier 100, field-effect transistor 110, resistive devices 121 and 122, capacitor 130, output line 140, positive input terminal 151, negative input terminal 152, multiplier 300, field-effect transistor 310, first resistive device 321, second resistive device 322, capacitor 330, output line 340, first input terminal 351, second input terminal 352, multiplier 400, field-effect transistor 410, first resistive device 421, second resistive device 422, capacitor 430, output line 440, first input terminal 451, second input terminal 452, multiplier 500, field-effect transistor 510, first resistive device 521, second resistive device 522, capacitor 530, output line 540, first input terminal 551, second input terminal 552, MAC circuit 600 multipliers 611, 612, and 613, output line 620, switch 621, first resistive device 721, second resistive device 722, first input terminal 851, second input terminal 852, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A multiply-accumulator (MAC) circuit comprising:
a plurality of multipliers each comprising:
   a field-effect transistor configured to apply an intermediate voltage to a node;
   a pair of resistive devices having resistance values determined based on the intermediate voltage applied to one ends connected to the node and weight setting voltages applied to the other ends; and
   a capacitor configured to be charged and discharged with an electric charge by receiving a voltage generated in the node corresponding to a value calculated by multiplying a weight corresponding to a combined resistance value of the pair of resistive devices by an input value corresponding to input voltages applied individually to the other ends of the pair of resistive devices in response to individual resistance values of the pair of resistive devices being determined; and
an output line configured to output a voltage based on electric charges charged to and discharged from the plurality of multipliers.

2. The MAC circuit of claim 1, wherein each of the pair of resistive devices is either one of a resistive random access memory (RRAM) and a magnetic random access memory (MRAM).

3. The MAC circuit of claim 1, wherein each of the pair of resistive devices is a resistive device having a variable resistance value.

4. The MAC circuit of claim 1, wherein, for each of the multipliers, the MAC circuit is configured to:
   determine the resistance values of the pair of resistive devices by applying a voltage to both ends of each of the pair of resistive devices; and
   write a weight according to a combined resistance value of the pair of resistive devices on the multiplier.

5. The MAC circuit of claim 1, wherein the combined resistance value of the pair of resistive devices corresponds to one ternary value among ternary values representing weights of connection lines between layers included in a neural network.

6. The MAC circuit of claim 1, wherein the MAC circuit is configured to:

apply a preset voltage to input terminals connected to the other ends of the pair of the resistive devices before the input voltages are applied to the pair of resistive devices; and apply the preset voltage to the output line so as to precharge both ends of the capacitor at the preset voltage.

7. The MAC circuit of claim 1, wherein, in response to the resistance values of the pair of resistive devices being determined, the MAC circuit is configured to:

individually apply the input voltages to input terminals connected to the other ends of the pair of resistive devices; and apply an input value according to combined input voltages to a multiplier.

8. The MAC circuit of claim 7, wherein the combined input voltages correspond to one ternary value among ternary values representing output values of nodes included in layers of a neural network.

9. The MAC circuit of claim 1, wherein the MAC circuit is configured to generate, in the node, a voltage corresponding to a value calculated by multiplying the input value corresponding to a combination of the input voltages individually applied to the pair of resistive devices, by the weight corresponding to a combination of the resistance values of the pair of resistive devices.

10. The MAC circuit of claim 1, wherein the output line is connected to each of the capacitors included in each of the plurality of multipliers and is configured to output a voltage based on an accumulation of electric charges charged to and discharged from each of the capacitors of the plurality of multipliers through capacitive coupling.

11. A method performed by a multiply-accumulator (MAC) circuit, the method comprising:

applying an intermediate voltage to a node by a field-effect transistor connected to the node;

determining resistance values of a pair of resistive devices based on the intermediate voltage applied to one ends of the pair of resistive devices connected to the node and weight setting voltages applied to the other ends of the pair of resistive devices;

charging and discharging an electric charge in a capacitor connected to the node by receiving a voltage generated in the node corresponding to a value calculated by multiplying a weight corresponding to a combined resistance value of the pair of resistive devices by an input value corresponding to input voltages individually applied to the other ends of the pair of resistive devices in response to individual resistance values of the pair of resistive devices being determined; and outputting a voltage based on the charged and discharged electric charge.

12. The method of claim 11, wherein each of the pair of resistive devices is either one of a resistive random access memory (RRAM) and a magnetic random access memory (MRAM).

13. The method of claim 11, wherein the determining of the resistance values of the pair of resistive devices comprises:

determining the resistance values of the pair of resistive devices by applying a voltage to both ends of each of the pair of resistive devices; and writing a weight according to a combined resistance value of the pair of resistive devices on a multiplier comprising the pair of resistive devices.

14. The method of claim 11, wherein the combined resistance value of the pair of resistive devices corresponds to one ternary value among ternary values representing weights of connection lines between layers included in a neural network.

15. The method of claim 11, wherein the charging and discharging of the electric charge comprises precharging both ends of a capacitor at a preset voltage by applying, before the input voltages are applied to the pair of resistive devices, the preset voltage to input terminals connected to the other ends of the pair of the resistive devices and applying the preset voltage to an output line.

16. The method of claim 11, wherein, in response to the resistance values of the pair of resistive devices being determined, the charging and discharging of the electric charge comprises:

individually applying the input voltages to input terminals connected to the other ends of the pair of resistive devices; and applying an input value according to combined input voltages to a multiplier.

17. The method of claim 16, wherein the combined input voltages correspond to one ternary value among ternary values representing output values of nodes included in layers of a neural network.

18. The method of claim 11, wherein the charging and discharging of the electric charge comprises generating, in the node, a voltage corresponding to the value calculated by multiplying an input value corresponding to a combination of the input voltages individually applied to the pair of resistive devices, by the weight corresponding to a combination of the resistance values of the pair of resistive devices.

19. A non-transitory computer-readable storage medium storing instructions that, when executed by one or more processors, configure the one or more processors to perform the method of claim 11.

20. A multiplier included in a multiply-accumulator (MAC) circuit, the multiplier comprising:

a field-effect transistor configured to apply an intermediate voltage to a node;

a pair of resistive devices having resistance values determined based on the intermediate voltage applied to one ends connected to the node and weight setting voltages applied to the other ends; and a capacitor configured to be charged and discharged with an electric charge by receiving a voltage generated in the node corresponding to a value calculated by multiplying a weight corresponding to a combined resistance value of the pair of resistive devices and by input value corresponding to input voltages applied individually to the other ends of the pair of resistive devices in response to individual resistance values of the pair of resistive devices being determined.

21. The multiplier of claim 20, wherein the multiplier is configured to generate, in the node, a voltage corresponding to the value calculated by multiplying an input value corresponding to a combination of the input voltages individually applied to the pair of resistive devices, by the weight corresponding to a combination of the resistance values of the pair of resistive devices.

22. A method performed by a multiply-accumulator (MAC) circuit, the method comprising:

writing a weight for a multiplier by applying an intermediate voltage to a node by a field-effect transistor connected to the node, the node corresponding to an end of each of a first resistive device and a second resistive device of the multiplier, and by applying a first weight setting voltage to another end of the first resistive device and a second weight setting voltage to another end of the second resistive device;

applying an input value to the multiplier by applying a first input voltage to the other end of the first resistive device and a second input voltage to the other end of the second resistive device; and generating an output value of a neural network node corresponding to a value calculated by multiplying the input value by the weight by discharging a capacitor connected to the node in response to the applying of the input value.

23. The method of claim 22, wherein the writing of the weight comprises:

writing a first weight in response to the first weight setting voltage being greater than the second weight setting voltage;

writing a second weight in response to the first weight setting voltage being a same value as the second weight setting voltage; and writing a third weight in response to the first weight setting voltage being less than the second weight setting voltage.

24. The method of claim 22, wherein the applying of the input value comprises:

applying a first input value in response to the first input voltage being greater than the second input voltage;

applying a second input value in response to the first input voltage being a same value as the second input voltage; and applying a third input value in response to the first input voltage being less than the second input voltage.

25. The method of claim 22, further comprising:

in response to the writing of the weight, applying a predetermined voltage to the other end of the first resistive device, the other end of the second resistive device, and an output line connected to an end of the capacitor, wherein the applying of the input value comprises applying the input value in response to the applying of the predetermined voltage.

* * * * *